3,117,372
STABILIZED RARE EARTH OXIDES FOR A CONTROL ROD AND METHOD OF PREPARATION
Robert A. McNees and Ralph A. Potter, Oak Ridge, Tenn., assignors to the United States of America as represented by the United States Atomic Energy Commission
No Drawing. Filed Nov. 15, 1962, Ser. No. 238,065
7 Claims. (Cl. 29—470)

Our invention relates to materials for nuclear reactor control rods and more particularly to a stabilized, hydration-resistant form of europium oxide and other rare earth oxides.

The neutron absorption characteristics of europium are favorable to its use as the active material in nuclear reactor control rods. Both europium and its radiation degradation products exhibit high neutron-capture cross sections so that this material is effective for long periods at high neutron fluxes. Europium has normally been utilized in the form of compacts comprising europium oxide, $Eu_2O_3$, dispersed in a stainless steel matrix and encased in stainless steel cladding. Control rods of this type have been employed in pressurized-water nuclear reactors wherein the control rods are in contact with coolant water at elevated temperature.

One of the problems presented in the use of europium oxide-containing control rods in aqueous nuclear reactor system is the reactivity of this oxide with water. Europium oxide undergoes a strong hydration reaction with water, particularly at normal operating temperatures for pressurized-water reactors, e.g., 250° C. to 300° C. Hydration produces volume change and distortion in the metal-oxide compact, followed by disintegration of the oxide and dispersion in the coolant water. It may be readily seen that a rupture of the control rod cladding would result in failure of the control system. A stable, hydration-resistant form of europium oxide is desired in order to avoid this potential hazard.

Europium oxide control rods have been stabilized previously by providing an additive oxide, i.e., titanium oxide, stannic oxide or ferric oxide, in the oxide-metal compact. The maximum proportion of europium oxide in the resulting combination, however, has been limited to about one mole per mole of additive oxide and the effectiveness of the combination as a neutron absorber has thus been low. Stabilization of europium oxide with a minimum amount of additive is desired.

Similar problems are presented in the use of other rare earth oxides for control rod applications. Other rare earths such as samarium, gadolinium and dysprosium are potentially useful as control rod materials, and their oxides behave in substantially the same manner as europium oxide.

It is, therefore, an object of our invention to render europium oxide stable in the presence of water at elevated temperatures.

Another object is to provide a europium oxide-containing material resistant to attack by high-temperature water.

Another object is to provide a water-stable control rod dispersion containing at least about 37 weight percent europium oxide.

Another object is to provide stabilized oxides of samarium, gadolinium and dysprosium.

Other objects and advantages of our invention will be apparent from the following detailed description and claims appended hereto.

In accordance with our invention, we provide a stable oxide of the formula $MR_xO_{12}$ wherein M is selected from the group consisting of molybdenum and tungsten, R is a rare earth element selected from the group consisting of samarium, europium, gadolinium and dysprosium, and $x$ is from 4 to 5. Oxides of this composition are stable and resistant to hydration by high-temperature water. The proportion of europium or other rare earth in the combination is high compared to the amount of additive oxide so that neutron-absorption capacity is not unduly decreased. This oxide combination is compatible with stainless steel and may be fabricated into dispersion-type compacts. In the event that a failure of control rod cladding occurs during operation of the reactor, the stable compact maintains its integrity, and no hazard is presented.

We have found that europium oxide and the other rare earth oxides form a stable mixed oxide in combination with a specified proportion of tungsten oxide or molybdenum oxide. Although our invention is not to be understood as limited to a particular theory, it is postulated that a distinct chemical compound of novel composition is formed. As evidenced by X-ray analysis, the combined oxide, referred to hereinafter as stable oxide, exhibits primarily a face-centered cubic crystal structure and line spectra. This pattern appears to be related to that of the body-centered europium oxide formed at lower temperatures, but which is unstable at the temperatures used to form this new stable oxide.

Europium oxide or the other rare earth oxide is admixed with the additive oxide at the proportion required for a stable combination. The composition of the stable combined oxide is one mole of tungsten or molybdenum per four to five moles europium or other rare earth oxide. For europium oxide this composition may be obtained by providing 14 to 16 weight percent molybdenum oxide, $MoO_3$, or 21 to 23 weight percent tungsten oxide, $WO_3$, with respect to total oxide in the mixture. Since the neutron-absorption effectiveness of the combination is decreased with increasing amounts of additive, the minimum effective amount, i.e., about 14 weight percent for $MoO_3$ or about 21 weight percent for $WO_3$, is preferred in the europium-containing stable oxide. The corresponding molar proportions may be employed for the other rare earth oxides.

Preparation of the stable oxide combination is effected by blending the oxide components, compressing the resulting mixture and firing the compact formed thereby at an elevated temperature in an oxygen-containing atmosphere. Although not critical, a compact forming pressure of at least about 10,000 pounds per square inch is preferred. Similarly, the firing temperature is not critical; however, a temperature of at least 1400° C. is desirable and a melting temperature (about 1700° C.) is preferred. Formation of the stable oxide is enhanced by providing the oxide components in finely divided form, e.g., 325 mesh (44 microns) or finer.

The stable oxide is compatible with stainless steel and may be utilized in the form of a compact comprising an oxide dispersion in a stainless steel matrix. Up to about 50 weight percent of the stable oxide may be incorporated into the resulting metal-oxide combination. Higher proportions of oxide may result in a metal-to-oxide ratio too low for satisfactory fabrication. Fabrication of the metal-oxide compact is effected by blending finely divided stainless steel and finely divided stable oxide, compressing the resulting mixture into compact form and heating the compact to a temperature of at least 1230° C. in a vacuum. Oxide and stainless steel powder having a particle size of about 35 to 40 microns is preferred. The stable oxide is decomposed in the presence of high-temperature hydrogen so that the previously used technique of fabricating the control rods in a hydrogen atmosphere is ineffective. A vacuum pressure not exceeding about $1 \times 10^{-5}$ millimeters of mercury is suitable for preparation of the oxide-metal compacts and for subsequent fabrication steps such as brazing of metal cladding. Except for avoiding contact of the stable oxide with gaseous hydrogen at elevated temperatures, the method of fabricating the compact into a product control rod is not critical.

Our invention is further illustrated by the following specific examples.

*Example I*

A one-half gram sample of an oxide mixture comprising 15 weight percent molybdenum oxide and the balance europium oxide was thoroughly blended and compressed into compact form in a metal die. The compact was then sintered in air at a temperature of 1600° C. Wet chemical analysis of the sintered compact revealed the following composition, in which percent: Molybdenum, 8.74; europium, 73.74; and the balance oxygen. X-ray diffraction analysis revealed a face-centered cubic crystal structure. A second pellet was prepared by this procedure except that the oxide mixture was heated to fusion temperature and the resulting fused mixed oxide was crushed prior to forming the compact. This pellet was placed in water in an autoclave and heated at 250° C. for 850 hours. The pellet maintained its integrity in this treatment and a weight gain of only 4 percent was observed. Under these conditions, pelletized europium oxide without an additive completely disintegrates in a period of less than 48 hours. A third molybdenum-containing pellet prepared in this manner showed no dimensional change or weight gain after being heated at 100° C. in water in an autoclave for 1250 hours.

It may be seen from the above that the oxide combination of our invention is highly resistant to attack by water.

*Example II*

An oxide mixture comprising 20 weight percent tungsten oxide and the balance europium oxide was thoroughly blended and compressed at 20,000 p.s.i. into compact form in a metal die. The compact was then sintered in air at a temperature of 1600° C. for one hour. The weight of the compact before sintering was about 2.0 g., and the as-fired weight was about 1.96 g. This compact was re-pressed at 20,000 p.s.i. and re-fired in air at 1600° C. for several hours. The re-pressed weight was 1.78 g., and the re-fired weight was 1.775 g.

The resultant compact was subjected to X-ray diffraction analysis and was found to exhibit primarily a face-centered cubic structure similar to that of the product of Example I.

*Example III*

Samarium oxide, $Sm_2O_3$, gadolinium oxide, $Gd_2O_3$, and dysprosium oxide, $Dy_2O_3$, were each combined with about 15 weight percent molybdenum oxide. Each mixture was pressed at 20,000 p.s.i. and the compact was sintered in air at 1600° C. X-ray diffraction patterns indicated a primarily face-centered cubic structure similar to the $Eu_2O_3$-$MoO_3$ mixture of Example I.

The above examples are merely illustrative and are not to be understood as limiting the scope of our invention, which is limited only as indicated by the appended claims. It is also to be understood that variations in apparatus and procedure may be employed by one skilled in the art without departing from the scope of our invention.

Having thus described our invention, we claim:

1. A stable oxide of the formula $$MR_xO_{12}$$

wherein M is a metal selected from the group consisting of tungsten and molybdenum, R is a rare earth element selected from the group consisting of samarium, europium, gadolinium and dysprosium, and $x$ is from 4 to 5.

2. A stable oxide of the formula $$MEu_xO_{12}$$

wherein M is a metal in the group consisting of molybdenum and tungsten and $x$ is from 4 to 5.

3. A stable oxide of the formula $$MoEu_xO_{12}$$

wherein $x$ is 4 to 5.

4. A stable oxide of the formula $$WEu_xO_{12}$$

wherein $x$ is 4 to 5.

5. Nuclear reactor control rod material consisting of an oxide of the formula $MEu_xO_{12}$, wherein M is a metal in the group consisting of molybdenum and tungsten and $x$ is 4 to 5, said oxide being dispersed and clad in stainless steel.

6. The method of preparing a hydration-resistant, europium-containing oxide which comprises mixing finely divided europium oxide with a finely divided additive oxide selected from the group consisting of tungsten oxide at a proportion of 21 to 23 weight percent of the resulting mixture and molybdenum oxide at a proportion of 14 to 16 weight percent of the resulting mixture, compressing the resulting mixture and firing the resulting compact at a temperature of at least 1400° C. in an oxygen-containing atmosphere.

7. The method of preparing a control rod for a nuclear reactor which comprises mixing finely divided europium oxide with a finely divided additive oxide selected from the group consisting of tungsten oxide at a proportion of 21 to 23 weight percent of the resulting mixture and molybdenum oxide at a proportion of 14 to 16 weight percent of the resulting mixture, compressing the resulting mixture, firing the resulting compact at a temperature of at least 1400° C. in an oxygen-containing atmosphere, comminuting the resulting hydration-resistant oxide compact, whereby finely divided stable oxide particles are formed, mixing said stable oxide particles with finely divided stainless steel particles, at a proportion not exceeding 50 weight percent stable oxide in the resulting mixture, compressing the resulting stainless steel-stable oxide mixture, heating the resulting stainless steel-stable oxide compact in vacuo at a tempertaure of at least 1230° C. and cladding the resulting sintered compact.

References Cited in the file of this patent
UNITED STATES PATENTS
3,031,395   Precht et al. _____ Apr. 24, 1962